United States Patent [19]

Baumann

[11] Patent Number: 4,822,002

[45] Date of Patent: Apr. 18, 1989

[54] MOVABLE SLEEVE TYPE VALVE

[76] Inventor: Hans D. Baumann, 32 Pine St., Rye, N.H. 03870

[21] Appl. No.: 263,813

[22] Filed: Oct. 28, 1988

[51] Int. Cl.$^4$ .............................................. F16K 7/06
[52] U.S. Cl. ....................................... 251/331; 251/8
[58] Field of Search ............................. 251/7, 331, 8

[56] References Cited

U.S. PATENT DOCUMENTS 2,285,974  6/1942  Huber .................................. 251/8 X
3,118,646  1/1964  Markey ............................ 251/331 X

FOREIGN PATENT DOCUMENTS 87514  2/1958  Netherlands ........................... 251/7

Primary Examiner—Arnold Rosenthal

[57] ABSTRACT

The movable sleeve type valve is comprised of a two piece metallic housing retaining therein a cylindrical insert with fluid conducting ports, where said cylindrical insert is surrounded by a flexible tubular sealing member. Said housing also retaining a sleeve which, together with suitable actuating devices, is capable of readily displacing said tubular sealing member towards said cylindrical insert and therefore capable of interrupting fluid flow through said port.

3 Claims, 1 Drawing Sheet

MOVABLE SLEEVE TYPE VALVE

BACKGROUND OF THE INVENTION

This invention relates to manually operated or actuator positioned modulating or shut-off valves to control the flow of fluid in a pipe conduit. The invention is especially suitable for use with sanitary media or highly corrosive fluids. Prior art of reference is my U.S. Pat. No. 4,214,730 which teaches the art of constructing a reciprocating plug valve cooperating with Teflon (tetrafluoroethylene) that is retained within a stainless steel housing. One major disadvantage of this prior construction is that it requires a stem packing seal which is subject to normal wear and could cause environmental problems due to stem leakage of acids or other dangerous chemicals handled by the valve.

Another prior art solution is shown in my U.S. Pat. No. 4,609,178. In this invention the stem leakage is eliminated by the use of an elastomeric diaphragm which cooperates with a metal valve seat. The disadvantage here is that, in order to be corrosion resistant, the valve housing has to be made from an expensive metal alloy. Also, due to problems with geometry, the design is not suitable for very small flow rates such as found in small pH control applications.

The present invention overcomes these and other objections as follows:

First, by using a cylindrical insert, within a pressure supporting metal housing, which is surrounded by a tube that simultaneously acts as stem seal and as valve closure member. Both the cylindrical insert and the sealing tube can be made from highly corrosion resistant plastic or from food grade type elastomers.

Secondly, the flow capacity of this valve can readily be changed by the interchange of a cylindrical insert with a different orifice or port size.

Thirdly, since the sealing tube is only slightly displaced around its central axis, there is very little stress (in contrast to stem sealing bellows) guaranteeing a long life cycle.

Fourthly, the inherent simplicity of design insures a low manufacturing cost and parts that are free of critical tolerances.

Finally, fine flow control is assured without the need of metal parts being in contact with the fluid.

These and other advantages may be better understood in view of the following annexed drawings:

DESCRIPTION OF THE INVENTION

While the invention will be described in connection with the preferred embodiment, it will be understood that it is not intended to limit the invention to this specific design. While the invention is illustrated as motivated by a hand wheel, it should be understood that it is intended to replace such a hard wheel with a motorized actuating device in order to perform automatic control functions. For example, it is anticipated that an actuator and linkage combination such as is shown in my U.S. Pat. No. 4,684,103 may be used to position the tubular seal.

Figure 1:
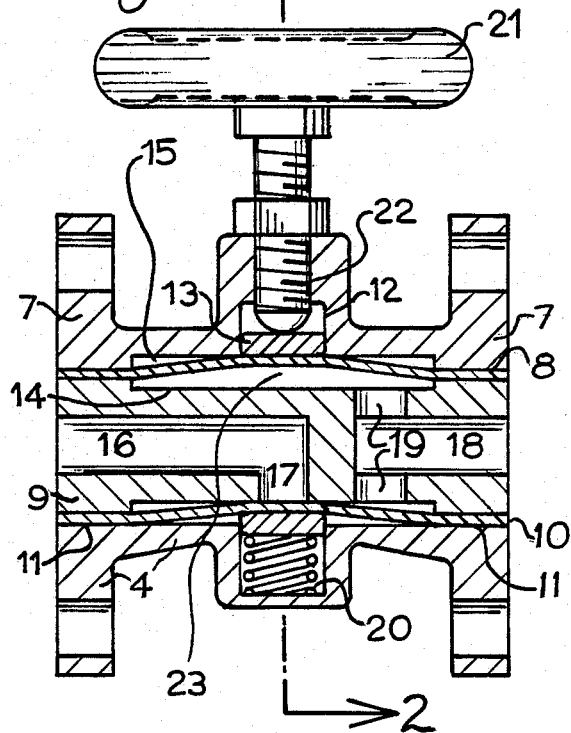
FIG. 1 is a vertical, central, cross-sectional view of a preferred embodiment of my invention in which the tubular sealing element is displaced to show a closed orifice.
Figure 2:
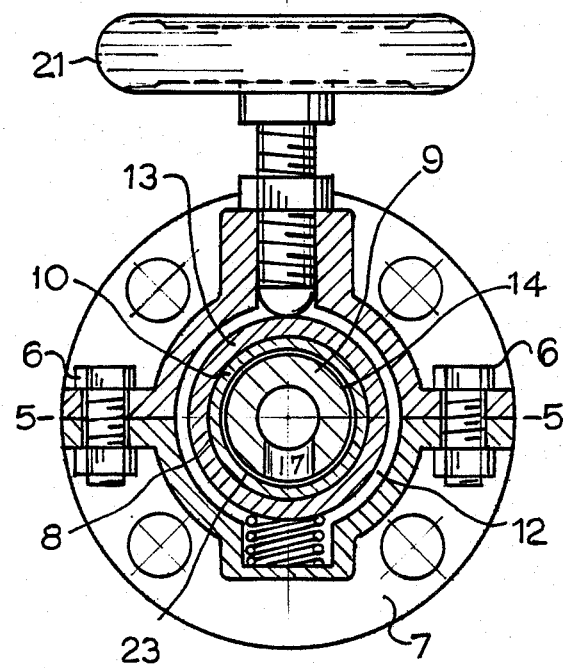
FIG. 2 is a vertical, cross-sectional view of the invention along the lines 2—2 in FIG. 1, with the tubular sealing element in the normal, central position showing the orifice uncovered.
Figure 3:
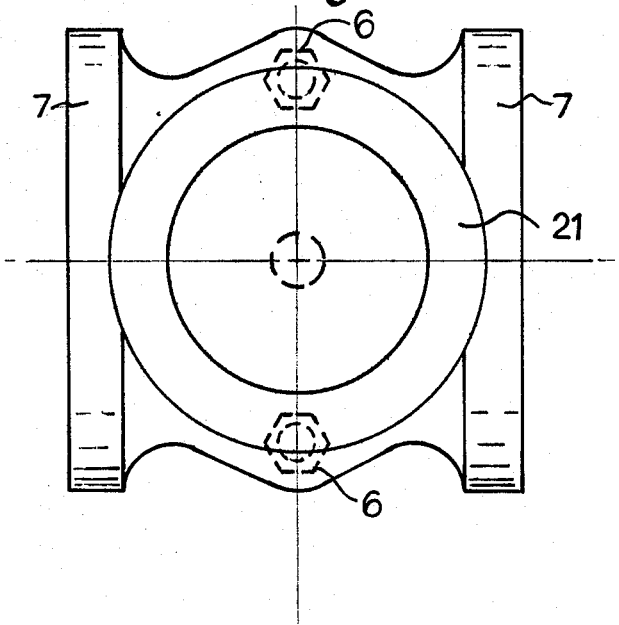
FIG. 3 is a top view of the invention.

Referring to FIG. 1, my invention is comprised of a two-piece metal valve housing which is joined along axis 5—5 by a number of fasteners 6. Housing 4 has a pair of flanges 7 suitable to interconnect to similar flanges of a piping system. A bore 8 extends along the central axis of housing 4 and contains therein a cylindrical element 9 surrounded by a tubular seal 10. Bore 8 has a slightly reduced diameter in respect to tube 10 in order to provide a sealing interface along surface 11 so that fluid cannot escape. Within the central section of housing 4 there is a radial recess 12 slidingly engaging therein a sleeve 13 the interior of which engages tube 10.

Cylindrical insert 9 has a recessed diameter portion 14 complemented by a similar diametrical clearance 15 in housing 4, therefore allowing tubular seal 10 a certain degree of eccentric displacement in respect to its central horizontal axis. Cylindrical insert 9 has a longitudinal, central passage 16 terminating in a perpendicular orifice 17 and an opposite central access port 18 which communicates fluid through a number of vertical holes 19 into a space provided between reduced diameter portion 14 and the inside diameter of sleeve 10.

As shown in FIG. 1, a compression spring 20 is retained in a lower cavity of housing 4 which exerts a biasing force against sleeve 13, thereby causing the tubular seal sleeve 10 to displace its central horizontal axis upwards and to cover orifice 17, thereby interrupting fluid flow. A hand wheel 21 is threadingly engaged at the upper extremity 22 of housing 4 and is capable of displacing sleeve 13 downwards, overcoming the force of spring 20, thereby disengaging the inside of sleeve 10 from orifice 17 and restoring a conduit of fluid between port 18, bores 19, cavity 23, orifice 17 and finally port 16.

In a typical configuration, the diameter of the tubular seal element 10 might be 1" with a 0.050 wall thickness and a diameter recess at 14 or 15 of 0.015". This insures that even at excess pressure levels the tube is never stretched beyond the elastic limit of its material composition and therefore provides a very reliable fluid seal.

Having thus described a typical embodiment of my invention, I hereby claim the following features:

1. (a) Movable sleeve type valve comprising a valve housing having a central horizontal bore and a central enlarged radial cavity;

(b) a circular insert having a central access port terminating in a radially extending vertical orifice and having a second opposite access port located along the same horizontal axis communicating with at least one more vertical port to the exterior of said cylindrical insert, said cylindrical insert having a reduced exterior diameter portion encompassing the area where the orifice and at least one additional vertical port are located;

(c) a tubular seal extending and surrounding the entire length of said cylindrical insert and having their outer extremities retained within said cylindrical bore of the valve housing;

(d) a sleeve slidingly engaged within the radial recess of said housing, the inner bore being in close contact with the outside diameter of said tubular seal;

(e) actuating means attached to said valve housing and capable of radial displacement of said sleeve and thereby the central portion of the tubular seal in order to cover or uncover said vertical orifice in the cylindrical insert.

2. Movable sleeve type valve as described in claim 1, wherein said housing contains spring means capable of exerting a biasing force on said sleeve sufficient to displace the tubular seal against the exterior of the cylindrical insert, thereby causing closure of the vertical orifice and prevent fluid flow.

3. Movable sleeve type valve as described in claim 1, wherein said housing is comprised of two halves capable of being bolted together and to provide firm clamping action for said cylindrical insert and its surrounding tubular seal.

* * * * *